July 7, 1959

T. C. DELKER 2,893,784

CO-ROTATING DUAL WHEEL CONSTRUCTION

Filed Jan. 15, 1954

INVENTOR.
THOMAS C. DELKER
BY
T. H. Murray
AGENT

United States Patent Office 2,893,784
Patented July 7, 1959

2,893,784
CO-ROTATING DUAL WHEEL CONSTRUCTION

Thomas C. Delker, South Bend, Ind., assignor to Bendix Aviation Corporation, South Bend, Ind., a corporation of Delaware Application January 15, 1954, Serial No. 404,327

2 Claims. (Cl. 301—36)

This invention relates to a dual wheel assembly and more particularly to a wheel assembly having no hub and side supporting elements.

In order to facilitate cross wind landings and taxying, one or more of the ground engaging wheels of an aircraft are sometimes pivoted or castered about an axis which is inclined forward at a small angle to the vertical. This type of castered wheel assembly will shimmy or oscillate about its vertical axis as the wheel moves over the ground due to varying, differential frictional resistance on the various parts of the ground-engaging surface of the tire. In an effort to prevent this undesirable oscillation, investigators have found that co-rotating dual wheels provide a stabilizing influence on the shimmy tendencies of castered wheel configurations. Existing co-rotation installations employ two separate wheels which are rigidly fixed to an axle. The axle, in turn, is rotatably supported in a bearing located at the lower extremity of a landing strut. Installations employing an axle, however, are relatively complex and cumbersome and complicate retraction of the wheel into the limited space provided in the aircraft wing or fuselage. That is, in existing installations the bearing surrounding the axle at the lower extremity of the strut must have a relatively large axial width in order to take the twisting moments applied to the axle as a result of differential loading on the two wheels. The large axial width of the bearing will necessarily increase the lateral width of the entire assembly and, consequently, will increase the space requirements of the housing for the retracted wheel.

Accordingly, and in view of the deficiencies of existing constructions, I have provided a simple, light-weight retractable wheel construction employing dual co-rotating wheels which have a minimized lateral width to satisfy the limited space requirements of the wheel compartment in the aircraft wing or fuselage.

Another object of the invention is to provide a dual wheel assembly which is rotatably supported on a bearing which surrounds the outer rim portion of the wheel. In this manner the need of a centrally disposed axle and hub is eliminated, and the over-all weight of the assembly is reduced.

A further object of the invention is to provide a simplified dual wheel construction which can be center-supported on a single bearing.

A still further object of the invention is to provide a dual wheel assembly having parts which can be readily forged.

The above and other objects and features of the invention will become apparent from the following description taken in connection with the accompanying drawings which form a part of this specification and in which.

Figure 1:
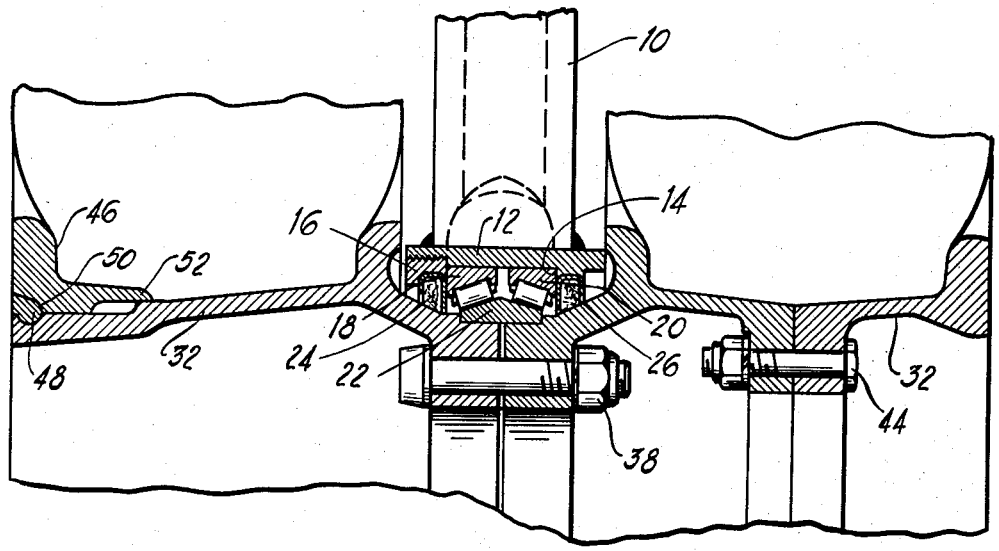
Figure 1 is a cross section of one form of the invention showing several different methods of construction.
Figure 2:
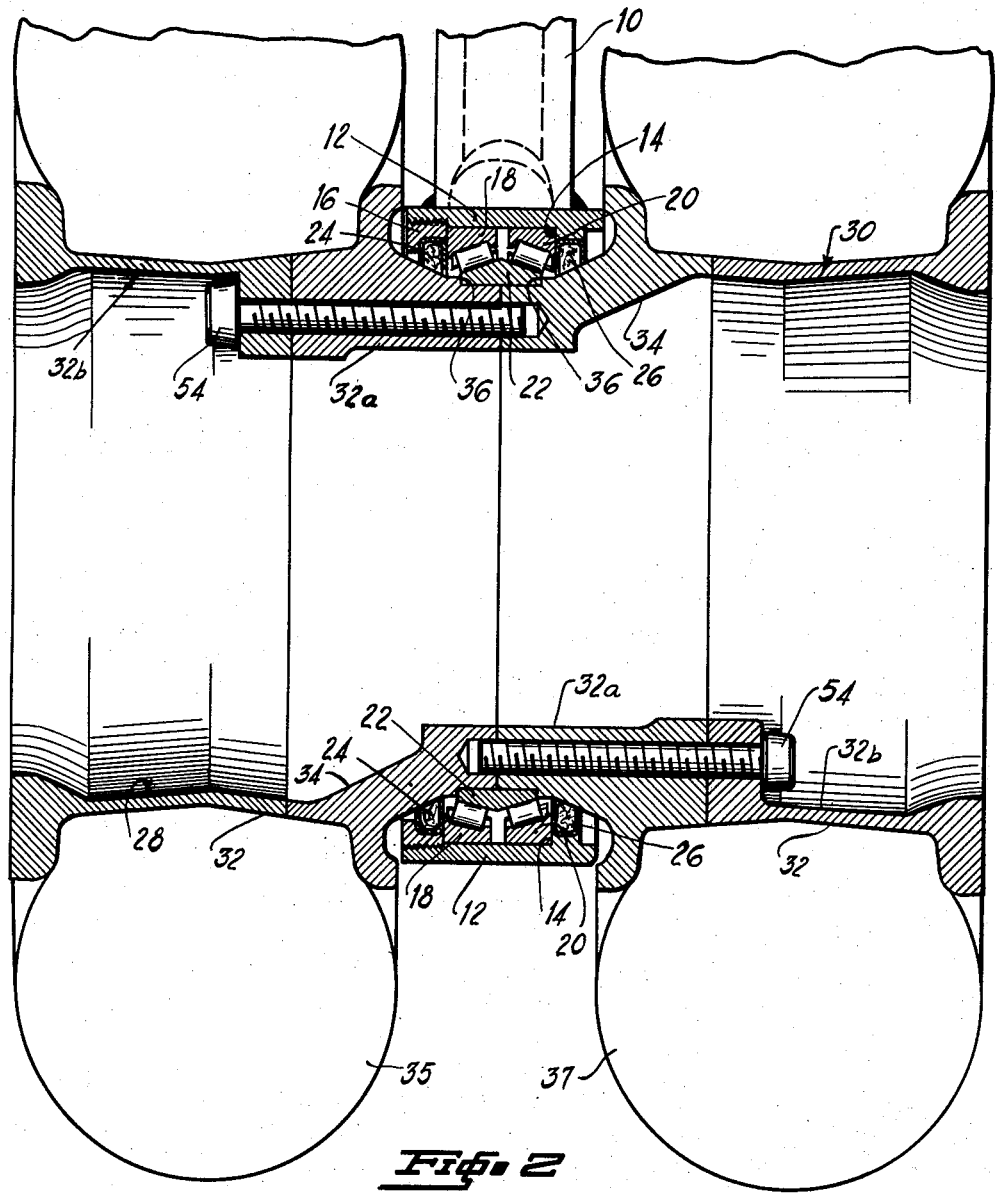
Figure 2 is a cross section of another form of the invention showing a further method of construction.

Referring to Figures 1 and 2, the lower cylinder 10 of a castered or swiveled aircraft shock strut is shown having an annular bearing housing 12 welded or otherwise joined to its lower extremity. Cylinder 10 is carried for swiveling motion in an associated upper cylinder, not shown. Anchored within housing 12 between shoulder 14 and ring nut 16 is a double row roller bearing having two outer races 18 and 20 and a single inner race 22. On each side of the bearing are a pair of annular oil seals 24 and 26. A pair of co-rotating wheels 28 and 30 are rotatably supported on the bearing means. Each wheel comprises, essentially, a tire supporting rim section 32 having an axially extending flange 34 at one side. The flanges are equipped with annular, radially extending shoulders 36 formed to abut the inner race 22. Suitable tires 35 and 37 are carried between the flanges.

In selecting a suitable bearing design certain factors must be considered. Any unsymmetrical loading on the wheels (which will necessarily occur as the wheel passes over the ground) will produce a moment tending to twist the wheel assembly about the bearing. This twisting action will cause opposing axial thrusts at the top and bottom of the bearing. Therefore, a bearing must be selected which can take axial thrusts in both directions as well as radial loads. Since a minimized lateral wheel width is a primary object of this invention, it is obviously desirable to use a narrow, tapered bearing as shown. As the bearing becomes increasingly narrow in axial width, the twisting moment on the bearing due to the upward force on the tire will increase because the moment are between the point of contact of the tire and the nearest edge of the bearing is increased. In the present invention the relatively narrow bearing can be used because of its large diameter. That is, since the diameter of the bearing is large, the moment arm of the side thrust it exerts in opposition to twisting moments will be large also; and, therefore, the actual side thrust on the bearing will be small.

Figure 1A:
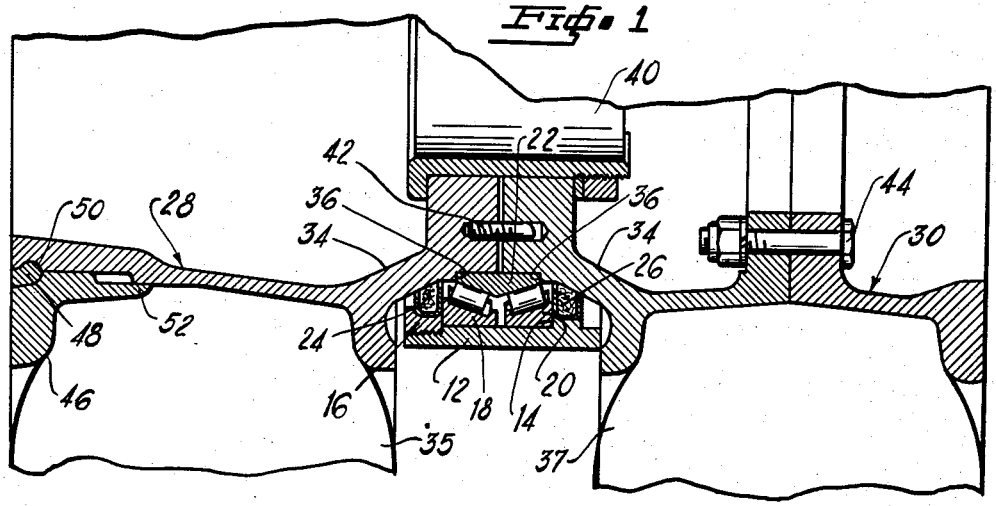
Figure 1a is a cross section of a slightly modified form of the invention shown in Figure 1.

Figure 1 and Figure 1a disclose two methods in which the wheels may be fastened together and locked against axial movement. A plurality of circumferentially spaced tie bolts 38 may be used to hold flanges 34 against the sides of inner race 22 or a threaded sleeve and nut assembly 40 may be used together with axially extending locating dowels 42. In wheel 30 a split rim construction having tie bolt connections 44 is used to hold the respective parts of the split rim in juxtaposition. Wheel 28 has an alternative demountable flange construction which facilitates removal and application of a tire from the side. The flange construction includes an annular tire retaining flange 46 and a flange retaining ring 48. Ring 48 is split at one point in its circumference in order that it may be snapped into annular groove 50 after flange 46 is slipped onto rim 32. In its assembled position, the lip or bead of the tire will lie on extension 52 of flange 46.

In Figure 2 another method of assembly is shown in which a plurality of circumferentially spaced tie bolt members 54 serve to hold the sections of the split rims together and also serve to hold shoulders 36 against the sides of race 22. The bolting members are passed through the outer and inner rim sections 32a and 32b of each wheel to threadedly engage the inner rim sections of the other wheel. In this way the necessity of separate fastening members for the wheels and their respective rim sections is eliminated.

It should be noted that the present wheel construction provides a convenient, light-weight means for preventing the torsional vibrations (i.e., rapid oscillation) of cylinder 10 within its associated upper cylinder which would otherwise occur in the case of either a single wheel or separately rotatable paired wheels. In order for a strut to oscillate which carries two wheels, it is necessary that one wheel rotate at a greater speed than the other. However, since in the present construction the wheels are co-rotating, one wheel cannot rotate at a greater speed than the other; and the strut can oscillate only by having the tires scrape or scrub on the ground. The result of the present invention, therefore, is a simplified wheel assembly which is torsionally stable about its castering axis.

Although this invention has been described in connection with certain specific embodiments, the principles set out are susceptible of numerous other applications that will readily occur to persons skilled in the art.

Having thus described my invention what I claim as new and desire to secure by Letters Patent is:

1. In an aircraft undercarriage, a turnable tubular strut member, and a dual wheel assembly carried at the end of said strut and comprising a vertically supported annular bearing housing carried at the lower extremity of said tubular strut member, tapered bearing means carried within said housing, and a pair of hubless co-rotating wheels rotatably supported on said bearing means, each of said wheels comprising a tire-supporting rim section having an inside diameter substantially the same as said bearing housing and an axially extending annular flange integral with one side of said rim section, said flange being carried on the inner periphery of said bearing an inflatable ground-engaging tire supported on each of said wheels and distortable by the weight of said aircraft, said tires being caused to scuff in ground engagement during differential rotation of the tires to thereby resist shimmying of the wheel assembly, and means for connecting said flanges in adjacent relationship, said connecting means comprising an axially extending sleeve having its one end flanged for abutment with one of said axially extending flanges and its other end threaded to receive a packing nut which abuts the other of said axially extending flanges, said flanges being thereby constructed and arranged to resist by force couple the side loading imposed thereon by said tires during scuffing thereof when the wheel assembly tends to shimmy.

2. In an aircraft undercarriage, a turnable tubular strut member, and a dual wheel assembly carried at the end of said strut and comprising a vertically supported annular bearing housing, a roller bearing assembly carried within said housing, said roller bearing assembly consisting of a double ring of oppositely tapered roller bearings and a pair of co-rotating hubless wheels rotatably supported on said assembly, each of said wheels comprising a tire-supporting rim section of two annular parts having an inside diameter substantially the same as said bearing assembly, one of said parts having an axially extending flange formed to abut the inner periphery of said bearing assembly, an inflatable ground-engaging tire supported on each of said wheels, the ground-engaging portion of said wheels being flattened by the weight of the aircraft to produce a surface contact between the ground and the ground-engaging portion of the tires, said pair of tires being arranged to develop a scuffing action over the ground surface during differential rotation of the tires which imposes a side loading on said dual wheel assembly when the dual wheel assembly undergoes shimmy and a plurality of bolting members associated with each rim section for holding the rims and their respective parts in juxtaposition, said bolting members passing through the parts of one rim section to threadedly engage said one part of the other rim section, said bolting means and bearing assemblies being constructed and arranged to resist by force couple the side thrust imposed thereon by the scuffing of said tires which occurs during shimmy of the wheel assembly.

References Cited in the file of this patent

UNITED STATES PATENTS

| 832,427 | Sisson | Oct. 2, 1906 |
| 978,161 | Holmes | Dec. 13, 1910 |
| 2,605,148 | Shoup | July 29, 1952 |
| 2,620,235 | Butler | Dec. 2, 1952 |

FOREIGN PATENTS

| 555,592 | Germany | July 29, 1931 |
| 985,509 | France | Mar. 14, 1951 |

UNITED STATES PATENT OFFICE
CERTIFICATE OF CORRECTION

Patent No. 2,893,784 July 7, 1959

Thomas C. Delker

It is hereby certified that error appears in the printed specification of the above numbered patent requiring correction and that the said Letters Patent should read as corrected below.

Column 2, line 30, for "are" read -- arm --.

Signed and sealed this 5th day of April 1960.

(SEAL)
Attest:

KARL H. AXLINE
Attesting Officer

ROBERT C. WATSON
Commissioner of Patents